United States Patent
Malhotra et al.

(10) Patent No.: US 11,558,732 B1
(45) Date of Patent: Jan. 17, 2023

(54) NETWORK FUNCTION DISCOVERY THROUGH NETWORK REPOSITORY FUNCTIONS IN A WIRELESS COMMUNICATION NETWORK

(71) Applicant: T-Mobile Innovations LLC, Overland Park, KS (US)

(72) Inventors: Rajil Malhotra, Olathe, KS (US); Anuj Sharma, Broadlands, VA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 78 days.

(21) Appl. No.: 17/232,980

(22) Filed: Apr. 16, 2021

(51) Int. Cl.
  *H04W 8/00* (2009.01)
  *H04W 24/02* (2009.01)
  *H04W 8/08* (2009.01)

(52) U.S. Cl.
  CPC ............. *H04W 8/08* (2013.01); *H04W 24/02* (2013.01)

(58) Field of Classification Search
  CPC ........... H04W 8/08; H04W 8/14; H04W 8/26; H04W 24/02
  See application file for complete search history.

(56) References Cited

U.S. PATENT DOCUMENTS

| | | | |
|---|---|---|---|
| 10,080,098 B1 | 9/2018 | Edge | |
| 10,361,843 B1 | 7/2019 | Suthar et al. | |
| 10,616,934 B2 | 4/2020 | Talebi Fard et al. | |
| 11,265,808 B2 * | 3/2022 | Wang | H04W 24/08 |
| 11,405,861 B2 * | 8/2022 | Regnault | H04W 24/02 |
| 2019/0053010 A1 | 2/2019 | Edge et al. | |
| 2019/0230556 A1 * | 7/2019 | Lee | H04W 28/16 |
| 2020/0260371 A1 * | 8/2020 | Wang | H04W 24/08 |
| 2020/0314672 A1 * | 10/2020 | Farooq | H04W 4/00 |
| 2020/0367148 A1 * | 11/2020 | Baek | H04W 48/16 |
| 2021/0014680 A1 * | 1/2021 | Saarinen | H04L 63/0281 |
| 2021/0084508 A1 | 3/2021 | Mendoza et al. | |
| 2021/0297935 A1 * | 9/2021 | Belling | H04L 63/0281 |
| 2021/0385734 A1 * | 12/2021 | Keller | H04L 67/51 |
| 2022/0045991 A1 * | 2/2022 | Khare | H04L 63/0281 |
| 2022/0225075 A1 * | 7/2022 | Shao | H04W 12/069 |

(Continued)

FOREIGN PATENT DOCUMENTS

| WO | WO-2021160676 A1 * | 8/2021 |
|---|---|---|
| WO | WO-2021194471 A1 * | 9/2021 |
| WO | WO-2022018581 A1 * | 1/2022 |

(Continued)

*Primary Examiner* — Khawar Iqbal

(57) ABSTRACT

A wireless communication network selects Network Functions (NFs) using a first Network Repository Function (NRF) and a second NRF. The first NRF receives first status data from a first set of the NFs and transfers the first status data to the second NRF. The second NRF receives second status data from a second set of the NFs and transfers the second status data to the first NRF. The first NRF receives a request for one of the NF types and responsively identifies status data for the one of the NF types. The first NRF indicates the status data. The second NRF receives another request for another one of the NF types and responsively identifies status data for the other one of the NF types. The second NRF transfers another response that indicates status data. The wireless communication network selects individual ones of the NFs based the status data.

18 Claims, 10 Drawing Sheets

(56) References Cited

U.S. PATENT DOCUMENTS

2022/0240171 A1\* 7/2022 Singh .................... H04W 48/16
2022/0272622 A1\* 8/2022 de-Gregorio-Rodriguez ..............
H04L 67/51

FOREIGN PATENT DOCUMENTS

WO WO-2022062920 A1 \* 3/2022
WO WO-2022083867 A1 \* 4/2022

\* cited by examiner

NETWORK FUNCTION DISCOVERY THROUGH NETWORK REPOSITORY FUNCTIONS IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs) and Network Repository Functions (NRFs).

In a wireless network core, the NRF provides a registry for the other network functions in the core. The network functions register their network address and function type with the NRF. To interact, one of the network functions requests the function type from the NRF. The NRF selects the other network function based on the requested function type and responds with the network address of the selected network function. Unfortunately, the NRF selects registered network functions that are limited to its own network core. Moreover, the NRF does not efficiently pair network functions from different network cores.

TECHNICAL OVERVIEW

A wireless communication network selects Network Functions (NFs) using a first Network Repository Function (NRF) and a second NRF. In the wireless communication network, the first NRF receives first status data from a first set of the NFs. The first NRF transfers the first status data to the second NRF. The second NRF receives second status data from a second set of the NFs. The second NRF transfers the second status data to the first NRF. The first NRF receives a request for one of the NF types. In response, the first NRF identifies a first set of the first status data for the one of the NF types and a second set of the second status data for the one of the NF types. The first NRF transfers a response that indicates the first set of the first status data and the second set of the second status data. The second NRF receives another request for another one of the NF types. In response, the second NRF identifies a third set of the first status data for the other one of the NF types and a fourth set of the second status data for the other one of the NF types. The second NRF transfers another response that indicates the third set of the first status data and the fourth set of the second status data. The wireless communication network selects individual ones of the NFs based on the first set of the first status data, the second set of the second status data, the third set of the first status data, and the fourth second set of the second status data.

DETAILED DESCRIPTION

Figure 1:
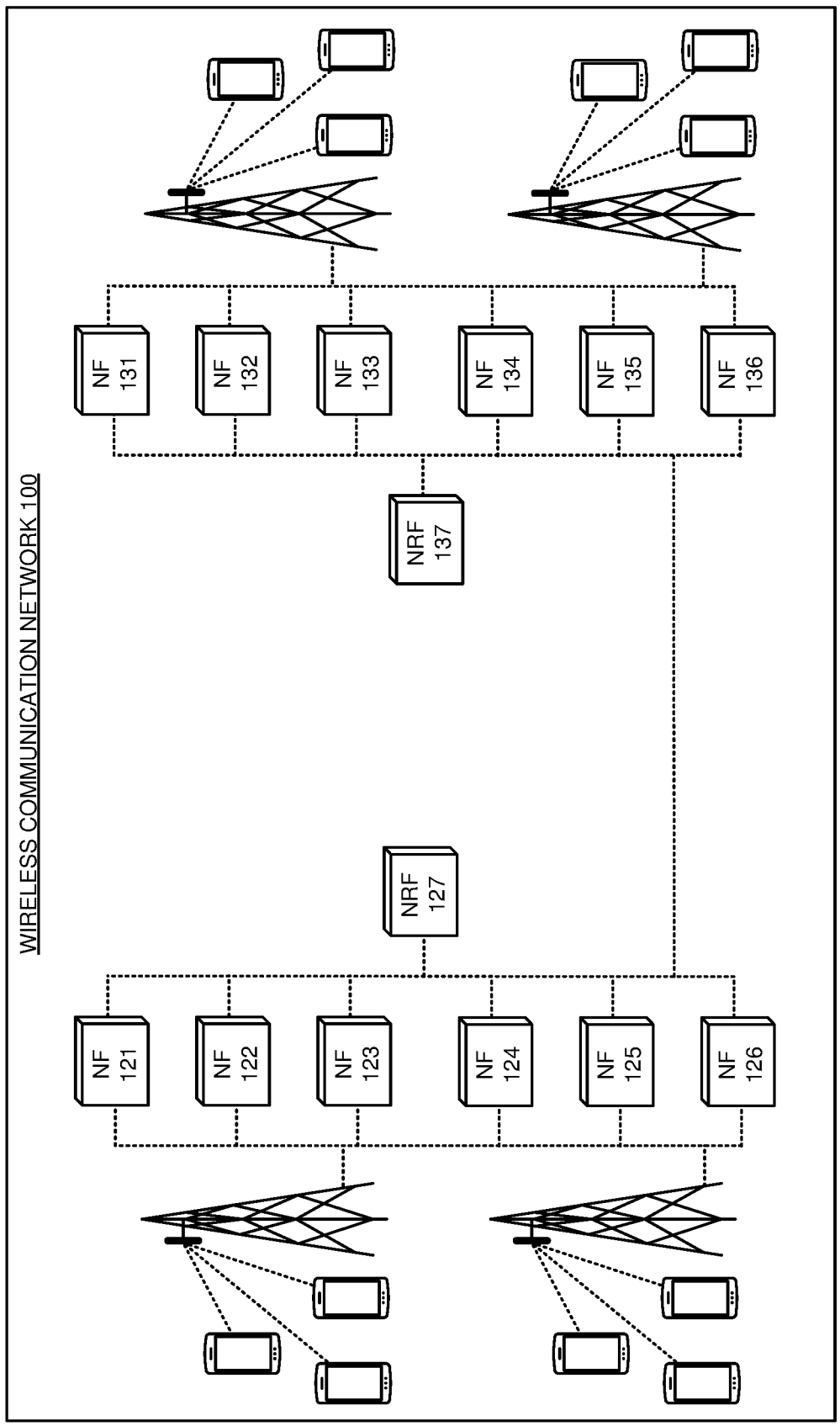
FIG. 1 illustrates a wireless communication network to discover Network Functions (NFs) through Network Repository Functions (NRFs).

FIG. 1 illustrates wireless communication network 100 to discover Network Functions (NFs) through Network Repository Function (NRF) 127 and NRF 137. Wireless communication network 100 delivers data services to wireless user devices like internet-access, machine communications, media-streaming, or some other wireless communications product. Wireless communication network 100 comprises NFs 121-126, NRF 127, NFs 131-136, and NRF 137. The number of NFs, NRFs, wireless user devices, and Radio Access Networks (RANs) has been restricted for clarity, and wireless communication network 100 may include many more NFs, NRFs, wireless user devices, and RANs.

Various examples of network operation and configuration are described herein. In some examples, NRF 127 receives status data for NFs 121-126 and transfers the status data to NRF 137. NRF 137 receives status data for NFs 131-136 and transfers the status data for NFs 131-136 to NRF 127. The status data may comprise NF locations, NF loads, NF addresses, NF capabilities, and/or other information for NFs 121-126 and 131-136. NRF 127 receives a request for one of the NF types. For example, NF 121 may transfer a request for NFs of type A to NRF 127. In response to the request, NRF 127 identifies a set of the status data for NFs 121-126 that comprise the requested NF type and identifies another set of the status data for NFs 131-136 that comprise the requested NF type. NRF 127 transfers a response that indicates the set of the status data for NFs 121-126 and the set of the status data for NFs 131-136. NRF 137 receives a request for another one of the NF types. For example, NF 133 may transfer a request for NFs of type B to NRF 137. In response to the request, NRF 137 identifies a set of the status data for NFs 121-126 that comprise the requested NF type and identifies another set of the status data for NFs 131-136 that comprise the requested NF type. NRF 137 transfers a response that indicates the set of the status data for NFs 121-126 and the other set of the status data for NFs 131-136. Wireless communication network 100 selects individual ones of NFs 121-126 and 131-136 based on the sets of the status data for NFs 121-126 and NFs 131-136. For example, NF 121 may select NF 136 based on the status data for NF 136. Advantageously, NRF 127 selects NFs that are not registered with itself and NRF 137 selects NFs that are not registered with itself. Moreover, NRFs 127 and 137 efficiently pair NFs that are registered with different NRFs.

The wireless user devices and RANs illustrated in FIG. 1 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. The RANs and NFs 121-126 and 131-136 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

The wireless user devices comprise computers, phones, vehicles, sensors, robots, or other types of data appliance with wireless and/or wireline communication circuitry. The RANs are depicted as towers but the RANs may use other mounting structures or no mounting structures at all. The RANs comprise Fifth Generation (5G) RANs, LTE RANs, gNodeBs, eNodeBs, NB-IoT access nodes, LP-WAN base stations, wireless relays, WIFI hotspots, ENET access nodes, Bluetooth access nodes, and/or some other type of wireless or wireline network transceiver. The wireless user devices and the RANs comprise antennas, amplifiers, filters, modulation, analog/digital interfaces, microprocessors, software, memories, transceivers, bus circuitry, and the like. NFs 121-126 and NFs 131-136 comprise network functions like Access and Mobility Management functions (AMFs), Session Management Functions (SMFs), User Plane Functions (UPFs), and the like. The RANs, NFs 121-126, NRF 127, NFs 131-136, and NRF 137 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
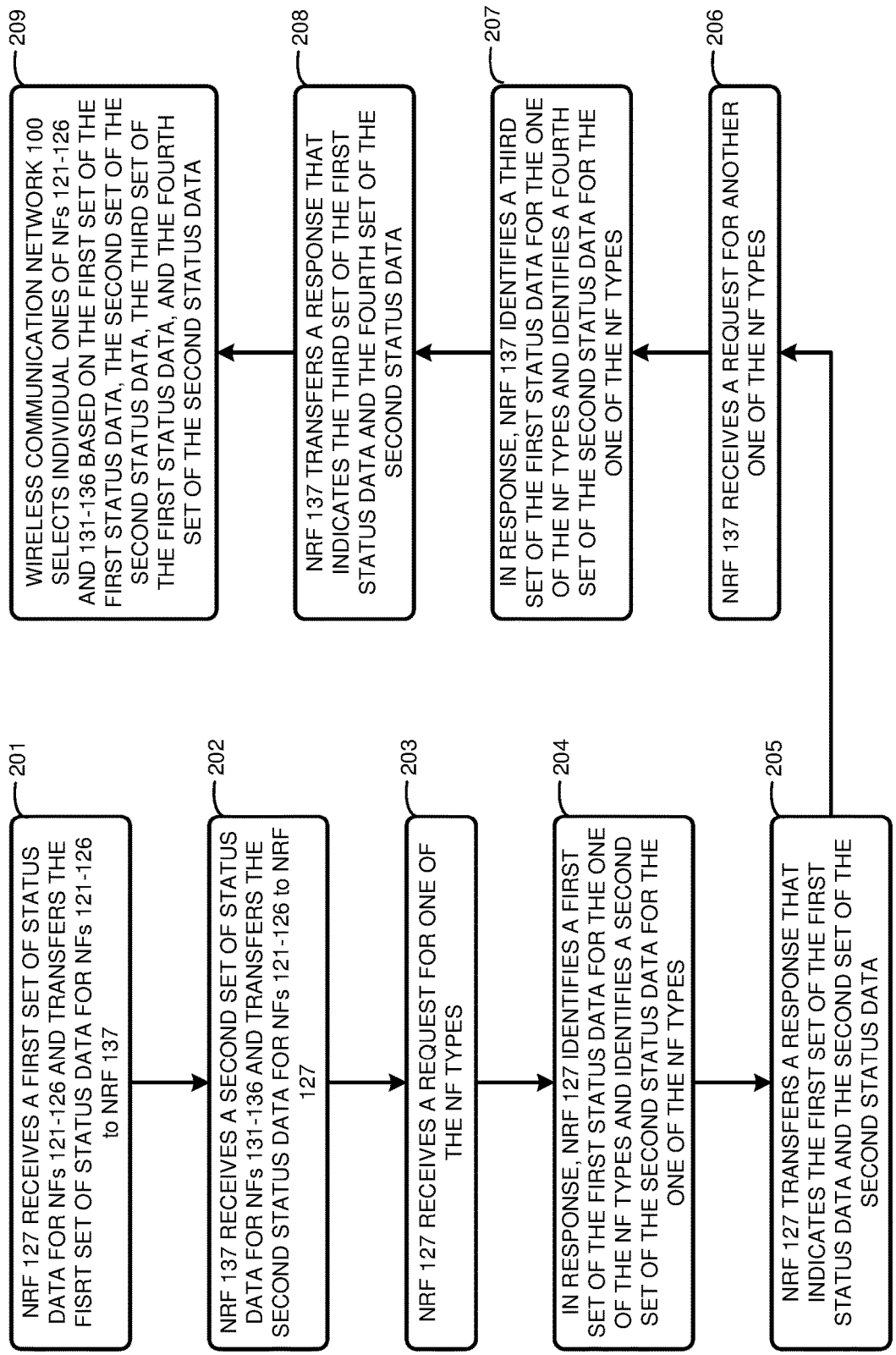
FIG. 2 illustrates an exemplary operation of the wireless communication network to discover NFs through NRFs.

FIG. 2 illustrates an exemplary operation of wireless communication network 100 to discover NFs through NRFs 127 and 137. The operation may vary in other examples. NRF 127 receives first status data for NFs 121-126 and transfers the first status data for NFs 121-126 to NRF 137 (201). NRF 137 receives second status data for NFs 131-136 and transfers the second status data for NFs 131-136 to NRF 127 (202). NRF 127 receives a request for one of the NF types (203). In response, NRF 127 identifies a first set of the first status data for the one of the NF types and identifies a second set of the second status data for the one of the NF types (204). NRF 127 transfers a response that indicates the first set of the first status data and the second set of the second status data (205). NRF 137 receives a request for another one of the NF types (206). In response, NRF 137 identifies a third set of the first status data for the other one of the NF types and identifies a fourth set of the second status data for the other one of the NF types (207). NRF 137 transfers a response that indicates the third set of the first status data and the fourth set of the second status data (208). Wireless communication network 100 selects individual ones of NFs 121-126 and 131-136 based on the first set of the first status data, the second set of the second status data, the third set of the first status data, and the fourth set of the second status data (209).

Figure 3:
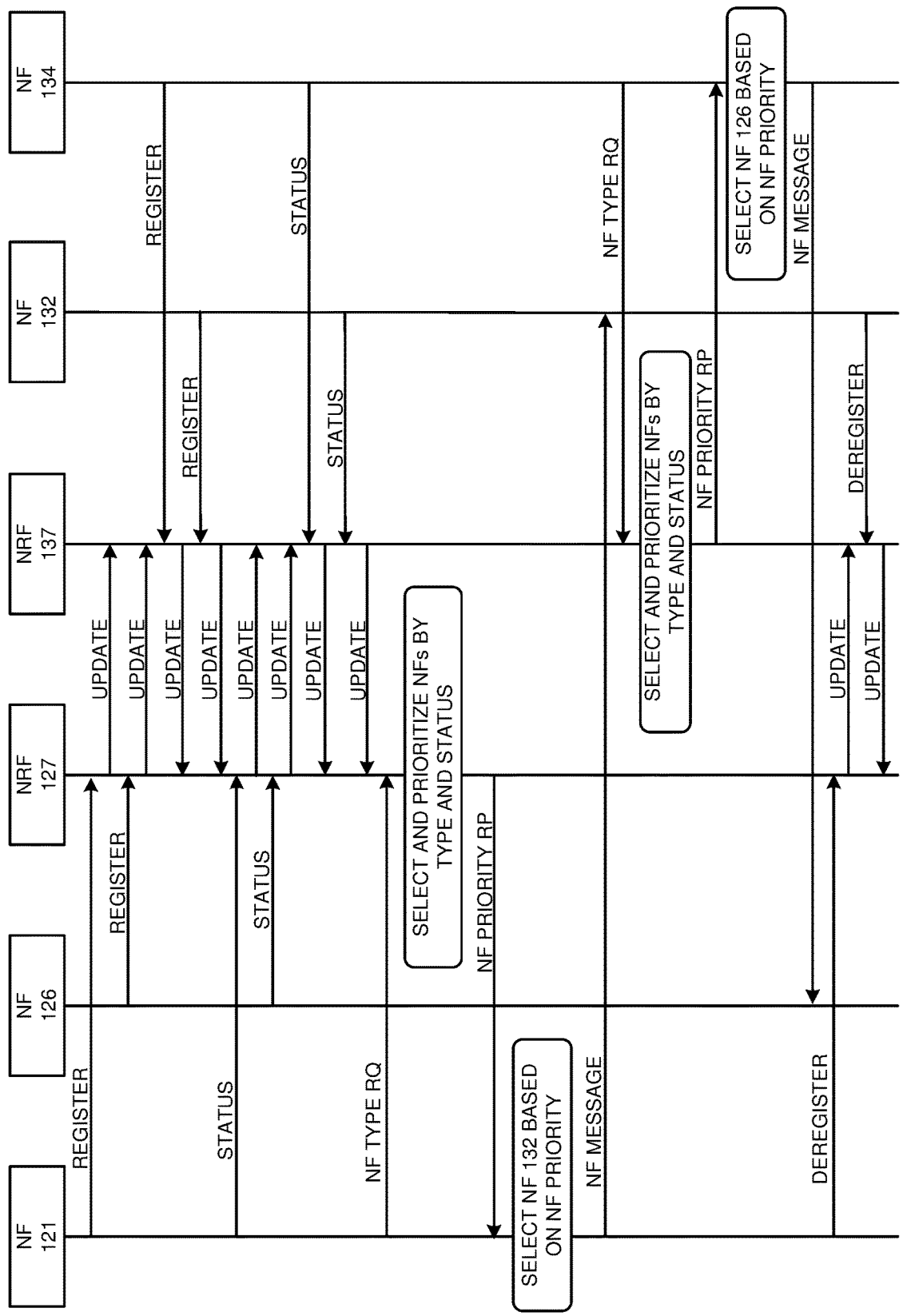
FIG. 3 illustrates another exemplary operation of the wireless communication network to discover NFs through NRFs.

FIG. 3 illustrates an exemplary operation of wireless communication network 100 to discover NFs through NRFs 127 and 137. The operation may vary in other examples. NF 121 registers with NRF 127. NRF 127 responsively transfers an update that indicates the registration of NF 121 to NRF 137. NF 126 registers with NRF 127. NRF 127 responsively transfers an update that indicates the registration of NF 126 to NRF 137. In a similar manner, NF 134 registers with NRF 137. NRF 137 responsively transfers an update that indicates the registration of NF 134 to NRF 127. NF 132 registers with NRF 137. NRF 137 responsively transfers an update that indicates the registration of NF 124 to NRF 127. The registrations indicate the network address, NF type, and geolocation for NFs 121, 126, 132, and 134.

NF 121 transfers a status update to NRF 127. NRF 127 responsively transfers an update that indicates the status of NF 121 to NRF 137. NF 126 transfers a status update to NRF 127. NRF 127 responsively transfers an update that indicates the status of NF 126 to NRF 137. In a similar manner, NF 134 transfers a status update to NRF 137. NRF 137 responsively transfers an update that indicates the status of NF 134 to NRF 127. NF 132 transfers a status update to NRF 137. NRF 137 responsively transfers an update that indicates the status of NF 124 to NRF 127. In this example, the status indicates the load for NFs 121, 126, 132, and 134. For example, the status for NF 126 may indicate that NF 126 is serving 245 Protocol Data Unit (PDU) sessions to wireless user devices.

NF 121 transfers an NF type request (RQ) to NRF 127. The NF type indicate Access and Mobility Management Functions (AMFs), Session Management Functions (SMFs), and/or other types of NFs. NRF 127 selects ones of NFs 122-126 and 131-136 that comprises the requested NF type. NRF 127 prioritizes the selected ones of NFs 122-126 and 131-136 based on their load, geolocation, and/or other factors. Typically, NRF 127 prioritizes NFs that have a lower load over NFs that have a higher load. Typically, NRF 127 prioritizes NFs that are geographically closer to NF 121 over NFs that are geographically further from NF 121. The factors may be used in combination to generate a priority score. NRF 127 transfers an NF priority response (RP) that indicates the selected ones of NFs 122-126 and 131-136 and their priority. NF 121 selects NF 132 based on the indicated priority for NF 132. NF 121 transfers an NF message to NF 132.

NF 134 transfers an NF type request to NRF 137. NRF 137 selects ones of NFs 121-126, 131-133, and 135-136 that comprises the requested NF type. NRF 137 prioritizes the selected ones of NFs 121-126, 131-133, and 135-136 based on their load, geolocation, and/or other factors. Typically, NRF 137 prioritizes NFs that have a lower load over NFs that have a higher load and prioritizes NFs that are geographically closer to NF 134 over NFs that are geographically further from NF 134. The factors may be used in combination to generate a priority score. NRF 137 transfers an NF priority response that indicates the selected ones of NFs 121-126, 131-133, and 135-136 and their priority. NF 134 selects NF 126 based on the indicated priority for NF 126. NF 134 transfers an NF message to NF 126.

NF 121 transfers a deregistration message to NRF 127. For example, NF 121 may enter a maintenance period and responsively deregister to prevent other NFs from discovering NF 121. NRF 127 deregisters NF 121 and transfers an update to NRF 137 that indicates the deregistration. In a similar manner, NF 132 transfers a deregistration message to NRF 137. NRF 137 deregisters NF 121 and transfers an update to NRF 127 that indicates the deregistration.

Figure 4:
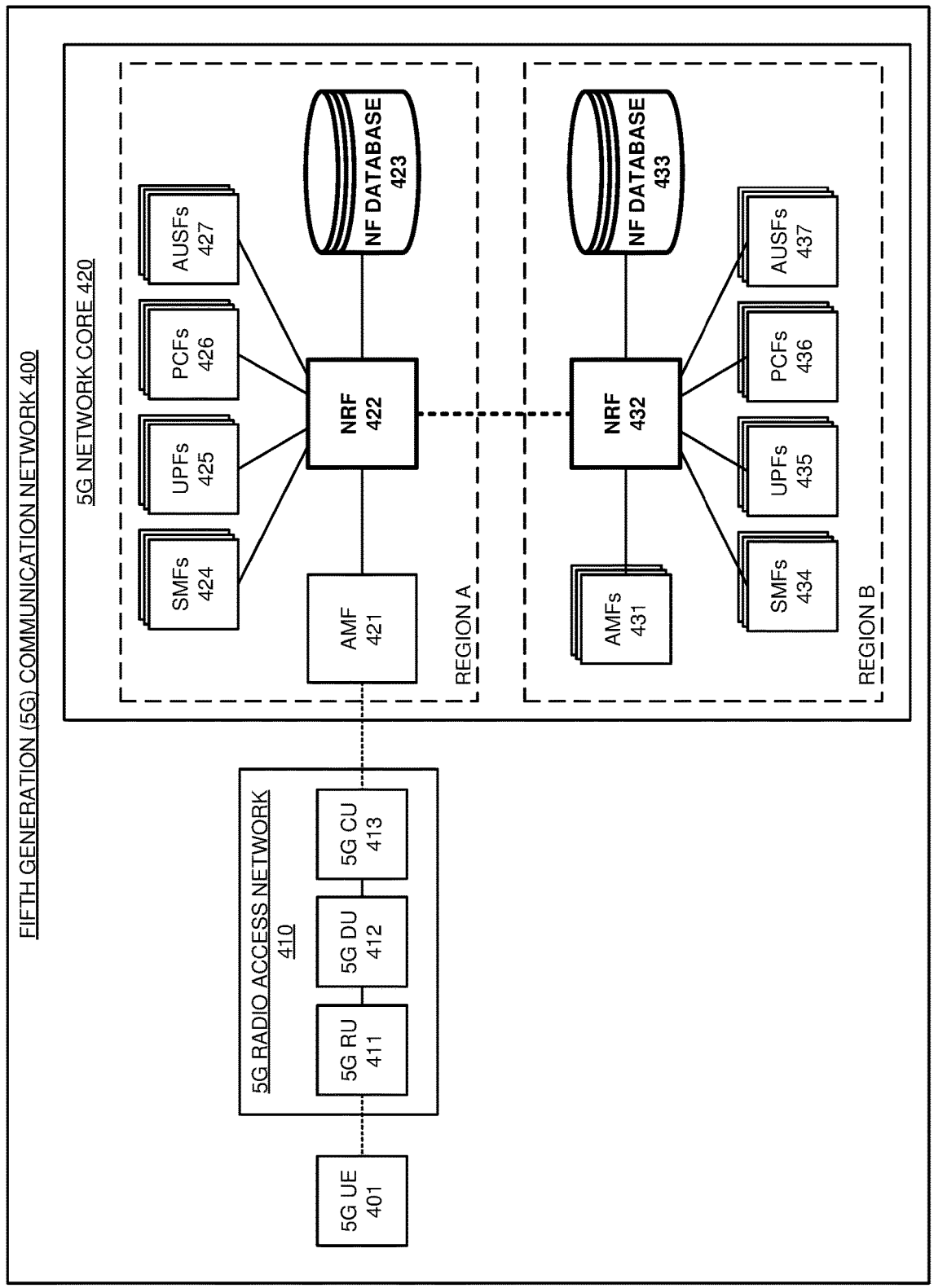
FIG. 4 illustrates a Fifth Generation (5G) communication network to discover NFs through NRFs.

FIG. 4 illustrates Fifth Generation (5G) communication network 400 to discover NFs through NRF 422. 5G communication network 400 comprises an example of wireless communication network 100, although network 100 may differ. 5G communication network 400 comprises 5G UE 401, 5G RAN 410, and 5G network core 420. 5G RAN 410 comprises 5G Radio Unit (RU) 411, 5G Distributed Unit (DU) 412, and 5G Centralized Unit (CU) 413. 5G network core 420 comprises Region A and Region B. In Region A, 5G network core 420 comprises Access and Mobility Management Function (AMF) 421, Network Repository Function (NRF) 422, NF database 423, Session Management Functions (SMFs) 424, User Plane Functions (UPFs) 425, Policy Control Functions (PCFs) 426, and Authentication Server Functions (AUSFs) 427. In Region B, 5G network core 420 comprises AMFs 431, NRF 432, NF database 433, SMFs 434, UPFs 435, PCFs 436, and AUSFs 437. Other network functions, network elements, and regions are typically present in network core 420 but are omitted for clarity. In some examples, NF database 423 is integrated into NRF 422. In some examples, NF database 433 is integrated into NRF 432.

In Region A, AMF 421 and NFs 424-427 register with NRF 422 and transfer registration information to NRF 422. The registration information comprises NF Identifier (ID), NF type, NF address, NF geolocation, NF load, NF capacity, and the like for individual ones of AMF 421 and NFs 424-427. NRF 422 receives the registrations and responsively maintains NF profiles in NF database 423 for AMF 421 and NFs 424-427. The NF profiles indicate individual status for NFs 421 and 424-427 and indicate the NF ID, NF type, NF address, NF geolocation, NF load, NF capacity, and the like for individual ones of NFs 421 and 424-427. NRF 422 maintains NF group data in NF database 423 that indicates the number of active sessions for each NF type. For example, the NF group data may indicate there are six active SMF instances of SMFs 424. NRF 422 transfers registration update messages to NRF 432. The registration update messages indicate the NF profiles and NF group data for AMF 421 and 424-427. NRF 432 updates NF database 433 to include the NF profiles and NF group data for AMFs 421 and NFs 424-427.

In a like manner in Region B, NFs 431 and 434-437 register with NRF 432. NFs 431 and 434-437 transfer registration information to NRF 432. The registration information comprises NF ID, NF type, NF address, NF geolocation, NF load, NF capacity, and the like for individual ones of NFs 431 and NFs 434-437. NRF 432 receives the registrations and responsively maintains NF profiles in NF database 433 for NFs 431 and 434-437. The NF profiles indicate individual status for NFs 431 and 434-437 and indicate the NF ID, NF type, NF address, NF geolocation, NF load, NF capacity, and the like for individual ones of NFs 431 and 434-437. NRF 432 maintains NF group data in NF database 433 that indicates the number of active sessions for each NF type. NRF 432 transfers registration update messages to NRF 422. The registration update messages indicate the NF profiles and NF group data for NFs 431 and 434-437. NRF 422 receives the registration update messages and responsively updates NF database 423 to include the NF profiles and NF group data for NFs 431 and 434-437.

In Region A, AMF 421 and NFs 424-427 transfer status updates to NRF 422. The status updates indicate updated NF load, NF capacity, and the like for individual ones of AMF 421 and NFs 424-427. Typically, AMF 421 and NFs 424-427 transfer status updates to NRF 422 to inform NRF 422 of their current status on a periodic, on-demand, or event-driven basis. NRF 422 receives the status updates and responsively updates the NF profiles in NF database 423 to indicate the updated NF load, NF capacity, and/or other updated information for AMF 421 and NFs 424-427. NRF 422 updates the NF group data in NF database 423 in response to the status updates. For example, one of SMFs 424 may deactivate and NRF 422 may update the NF group data to reflect this change. NRF 422 transfers status update messages for AMF 421 and NFs 424-427 to NRF 432. The status update messages indicate the updated NF profiles and updated NF group data for AMF 421 and NFs 424-427. In response, NRF 432 updates NF database 433 to include the updated NF profiles and updated NF group data for AMFs 421 and NFs 424-427.

In a similar manner in Region B, NFs 431 and 434-437 transfer status updates to NRF 432 that indicate updated NF load, NF capacity, and the like for individual ones of NFs 431 and 434-437. Typically, NFs 431 and 434-437 transfer status updates to NRF 432 on a periodic, on-demand, or event-driven basis. NRF 432 receives the status updates and responsively updates the NF profiles in NF database 433 to indicate the updated NF load, NF capacity, and/or other updated information for NFs 431 and 434-437. NRF 432 updates the NF group data in NF database 433 in response to the status updates. For example, one of PCFs 434 may instantiate and NRF 432 may update the NF group data to reflect this change. NRF 432 transfers status update messages for NFs 431 and 434-437 to NRF 422. The status update messages indicate the updated NF profiles and updated NF group data for NFs 421 and 434-437. In response, NRF 422 updates NF database 423 to include the updated NF profiles and updated NF group data for NFs 431 and 434-437.

UE 401 wirelessly attaches to RU 411 and transfers attachment signaling to CU 413 over RU 411 and DU 412. The attachment signaling indicates a registration request for UE 401 to register with 5G core 420. CU 413 transfers a registration request for UE 401 to AMF 421. AMF 421 interacts with other network functions to authenticate and authorize UE 401 for wireless network services. For example, AMF 421 may interact with one of AUSFs 427 to authenticate UE 401. Responsive to the authentication and authorization, AMF 421 retrieves UE context for UE 401. The UE context comprises Quality-of-Service (QoS), slice IDs, network addresses, and the like. AMF 421 transfers the UE context for UE 401 to CU 413. CU 413 transfers the UE context to UE 401 over DU 412 and RU 411.

UE 401 wirelessly transfers a service request to CU 413 over RU 411 and DU 412. The service request may comprise a Protocol Data Unit (PDU) session request, a voice call request, or some other type of network service request. CU 413 transfers the service request to AMF 421. In response to the service request, AMF 421 identifies a NF function need to serve the requested network service to UE 401. For example, AMF 421 may determine that is does not currently have access to an SMF that can serve the requested PDU session type to UE 401. AMF 421 transfers an NF discovery request for an NF type to NRF 422. NRF 422 identifies the requested NF type in the NF discovery request. For example, the NF discovery request may specify PCF as the NF type. NRF 422 queries NF database 423 for NF profiles and NF group data for the requested NF type. For example, NRF 422 may query NF database 423 for NF profiles and NF group data for AUSFs and NF database 423 may return NF profiles and NF group data for AUSFs 427 and 437.

NRF 422 identifies individual ones of the requested NF type in both Region A and Region B based on the NF profiles. NRF 422 identifies the number of active NFs of the requested NF type in each region based on the NF group data. NRF 422 prioritizes the individual ones of the requested NF type based on NF geolocation, NF load, NF capacity. Typically, NRF 422 prioritizes NFs that are geographically close to AMF 421 over NFs that are geographically further from AMF 421. Typically, NRF 422 prioritizes NFs that have lower load over NFs that are heavily loaded. Typically, NRF 422 prioritizes NFs that have more capacity over NFs that have less capacity. In some examples, the NF load comprises microprocessor load and NF capacity comprises memory occupancy. In some examples, NRF 422 normalizes the NF geolocation, load, and capacity into a combined priority score to prioritize the NFs.

NRF 422 generates a prioritized list based on the priorities of the identified NFs. The prioritized list ranks NFs that are more suited to serve AMF 421 higher than NFs that are less suited to serve AMF 421. Furthermore, the prioritized list indicates NF geolocation, NF load, and NF capacity for the individual ones of the identified NFs. NRF 422 transfers the prioritized list to AMF 421. AMF 421 selects one of the indicated NFs based on its priority, geolocation, load, capacity, and/or other factors. AMF 421 interacts with the selected NF to complete the service request for UE 401. For example, AMF 421 may interact with an SMF of SMFs 434 to establish a PDU session for UE 401.

In some examples, ones of NFs 424-427 may interact with NRF 422 to discover NFs in both Region A and Region B in a similar manner to AMF 421. For example, one of PCFs 426 may interact with NRF 422 to discover SMFs 424 and 434. In some examples, ones of NFs 431 and 434-437 may interact with NRF 432 to discover other NFs in both Region A and Region B in a similar manner to AMF 421. For example, one of SMFs 434 may interact with NRF 432 to discover UPFs 425 and 426.

In some examples, NRFs 422 and 432 hide individual ones of NFs 424-427, 431, and 434-437 from discovery. NRF 422 retrieves NF profiles and NF group data for NFs 424-427 431, and 434-437 and determines the NF geolocation, load, capacity, and number of active NF instances. NRF 422 determines a NF performance threshold and when individual ones of NFs 424-427 and 431, and 434-437 fall below the performance threshold. For example, NRF 422 may determine the capacity for one of PCFs 436 is below performance threshold and NRF 422 may responsively hide the one of PCFs 436. NRF 422 does not indicate hidden ones of NFs 424-426, 431, and 434-437 to other NFs to prevent the other NFs from discovering the hidden NFs. In Region B, NRF 432 may hide NFs 424-426, 431, and 434-437 in a similar manner as NRF 422.

In some examples, NRFs 422 and 432 load balance the discovery of NFs 424-427, 431, and 434-437. NRF 422 receives a discovery request from AMF 421 (or another NF in Region A) for an NF type. NRF 422 retrieves NF profiles and NF group data for the requested NF type. NRF 422 determines the number of active instances of the NF type in Region A and the number of active instances of the NF type in Region B. For example, the requested NF type may be AUSF and NRF 421 may determine there are four active ones of AUSFs 427 and two active ones of AUSFs 437. NRF 421 prioritizes the ones of the requested NF type based on the number of active sessions to load balance discovery of the requested NF type across Regions A and B. For example, if there are more available the PCFs of PCFs 426 in Region A than available PCFs of PCFs 436 in Region B, NRF 422 may prioritize the PCFs of PCFs 426 over the PCFs of PCFs 436. Typically, NRF 422 priorities the requested NF type to distribute NF usage across the 5G core 420 and to prevent NFs in any one region from becoming overburdened. NRF 422 indicates the NF priorities to AMF 421. In Region B, NRF 432 may load balance the discovery of NFs 424-426, 431, and 434-437 in a similar manner as NRF 422.

In some examples, NRFs 422 and 432 may block NFs from sending NF discovery requests. NRF 422 receives NF discovery requests from NFs 421 and 424-426. NRF determines a request threshold. NRF 422 receives multiple NF discovery requests from an individual one of NFs 421 and 424-427. NRF 422 determines the number of requests received from the individual one of NFs 421 and 424-427 exceeds the request threshold. In response, NRF 422 blocks the NF from sending additional requests to prevent that NF from spamming NRF 422. In some examples, NRF 422 may receive unauthorized messages from an NF or some other type of entity and responsively block the NF or entity. For example, an NF may send an unauthorized message to access confidential information in NF database 423 and NRF 422 may responsively block the entity. In Region B, NRF 432 may block NFs and entities in a manner similar to NRF 422.

In some examples, NRFs 422 and 432 may shield NFs from receiving NF discovery requests. A target NF that has been overused by a source NF may register a new address with NRF 422 and instruct NRF 422 to stop the discovery of the target NF by the source NF. NRF 422 shares this instruction with NRF 432. NRFs 422 and 432 will not allow the source NF to discover the new address of the target NF.

Although NRFs 422 and 432 are located in different regions of the same network core, in some examples, NRFs 422 and 432 may comprise a home NRF and a visiting NRF that are located in different network cores. In this example, NRFs 422 and 432 may exchange registration updates in the manner described above and in accordance with a roaming agreement to discover NFs across network cores. The roaming agreement may drive NRFs 422 and 432 to conceal certain information that they share. For example, NRFs 422 and 432 conceal NF capacity when the roaming agreement does not authorize the sharing of NF capacity information.

Figure 5:
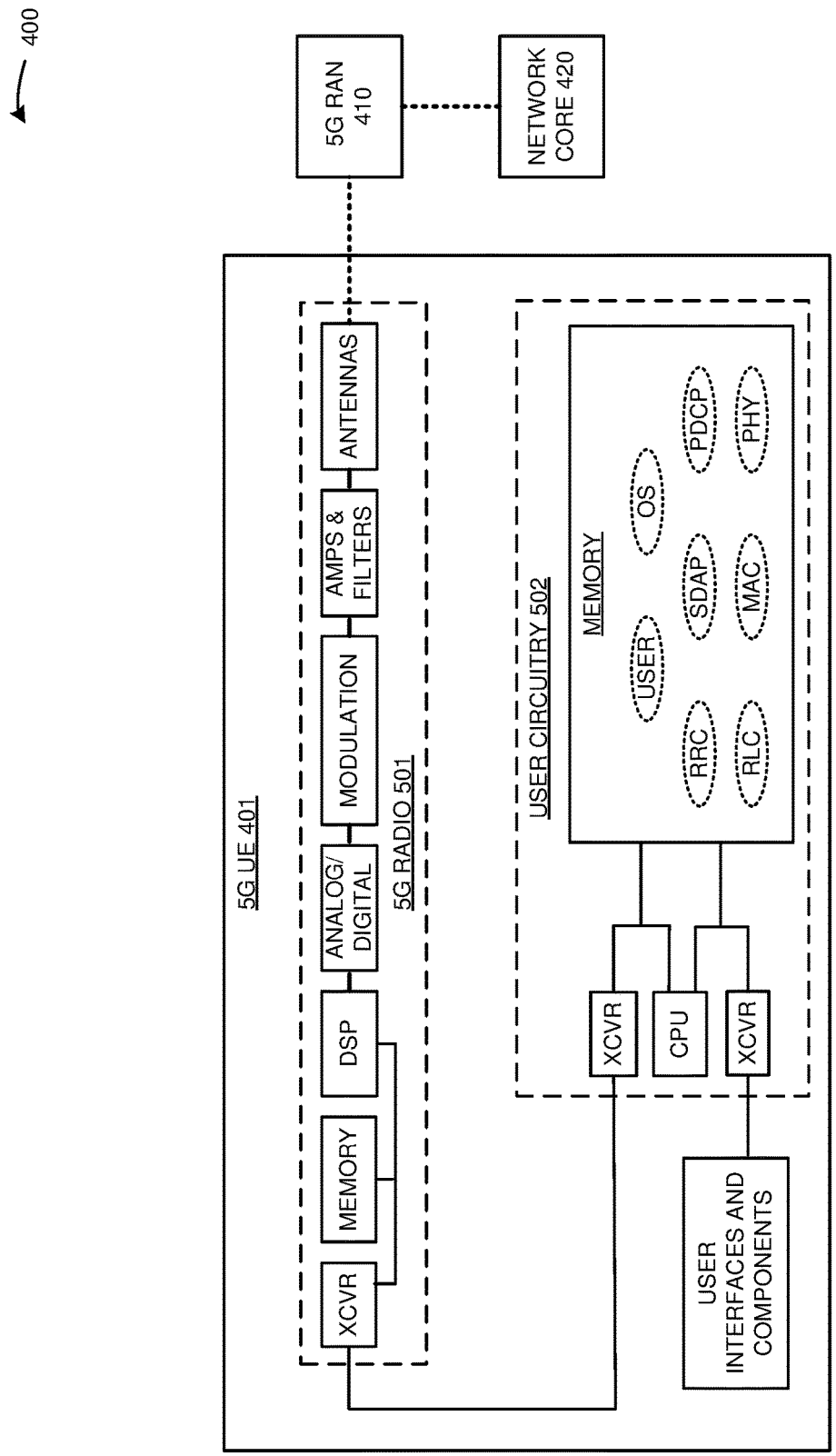
FIG. 5 illustrates a 5G UE in the 5G communication network.

FIG. 5 illustrates 5G UE 401 in 5G communication network 400. UE 401 comprises an example of the wireless user devices illustrated in FIG. 1, although the wireless user devices illustrated in FIG. 1 may differ. UEs 401 comprises 5G radio 501 and user circuitry 502. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 410 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
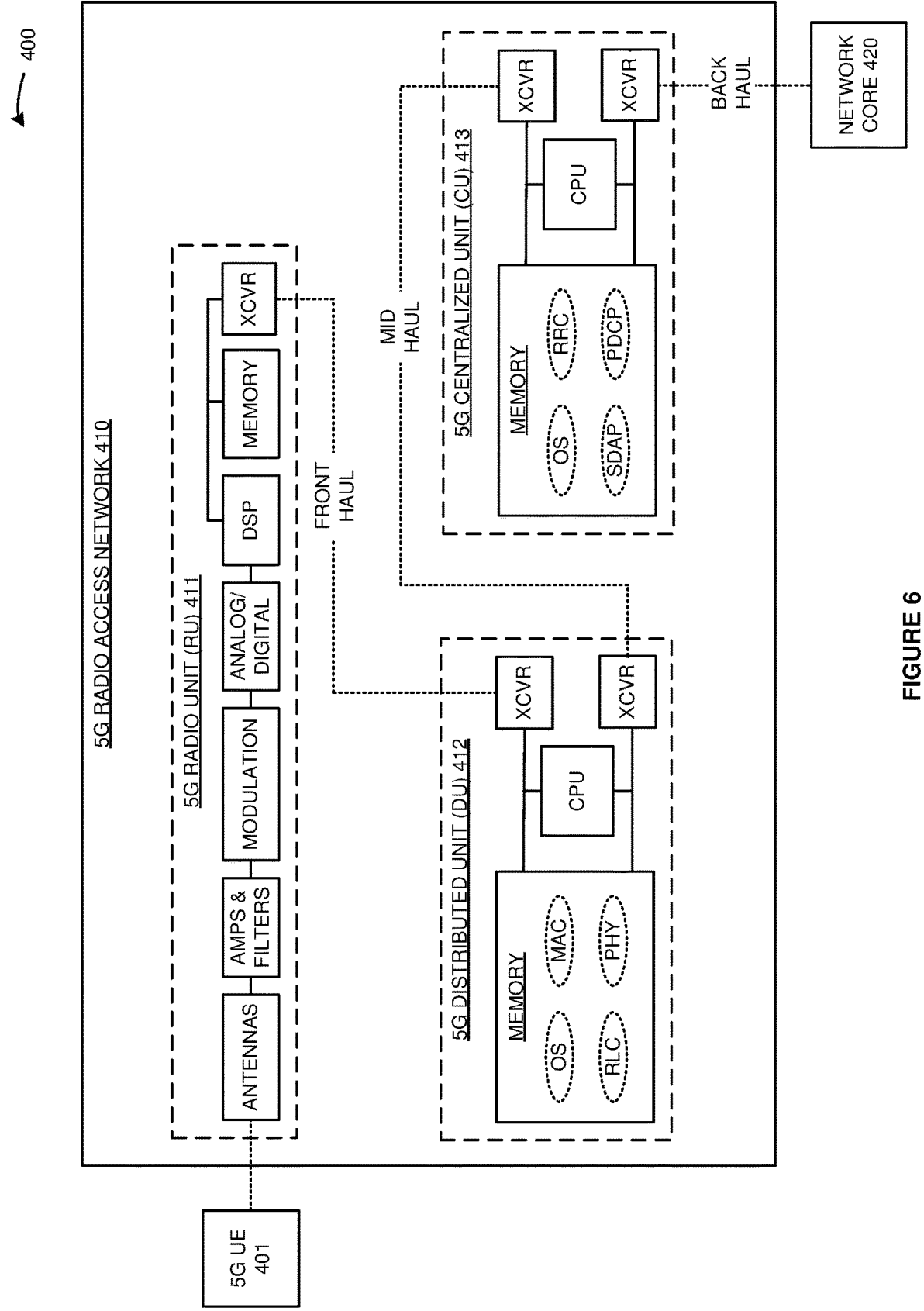
FIG. 6 illustrates a 5G RAN in the 5G communication network.

FIG. 6 illustrates 5G RU 411, 5G DU 412, and 5G CU 413 in 5G communication network 400. RU 411, DU 412, and CU 413 comprise an example of the RANs illustrated in FIG. 1, although the RANs illustrated in FIG. 1 may differ. RU 411 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over 5GNR links. Transceivers in 5G RU 411 are coupled to transceivers in 5G DU 412 over fronthaul links like enhanced Common Public Radio Interface (eCPRI). The DSP in RU 411 executes its operating systems and radio applications to exchange 5GNR signals with UE 401 and to exchange 5GNR data units with DU 412.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 store an operating system and 5GNR network applications like PDCP, SDAP, and RRC. Transceivers in 5G DU 412 are coupled to transceivers in RUs 411 over front-haul links. Transceivers in DUs 412 are coupled to transceivers in CUs 413 over mid-haul links. A transceiver in CU 413 is coupled to network core 420 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
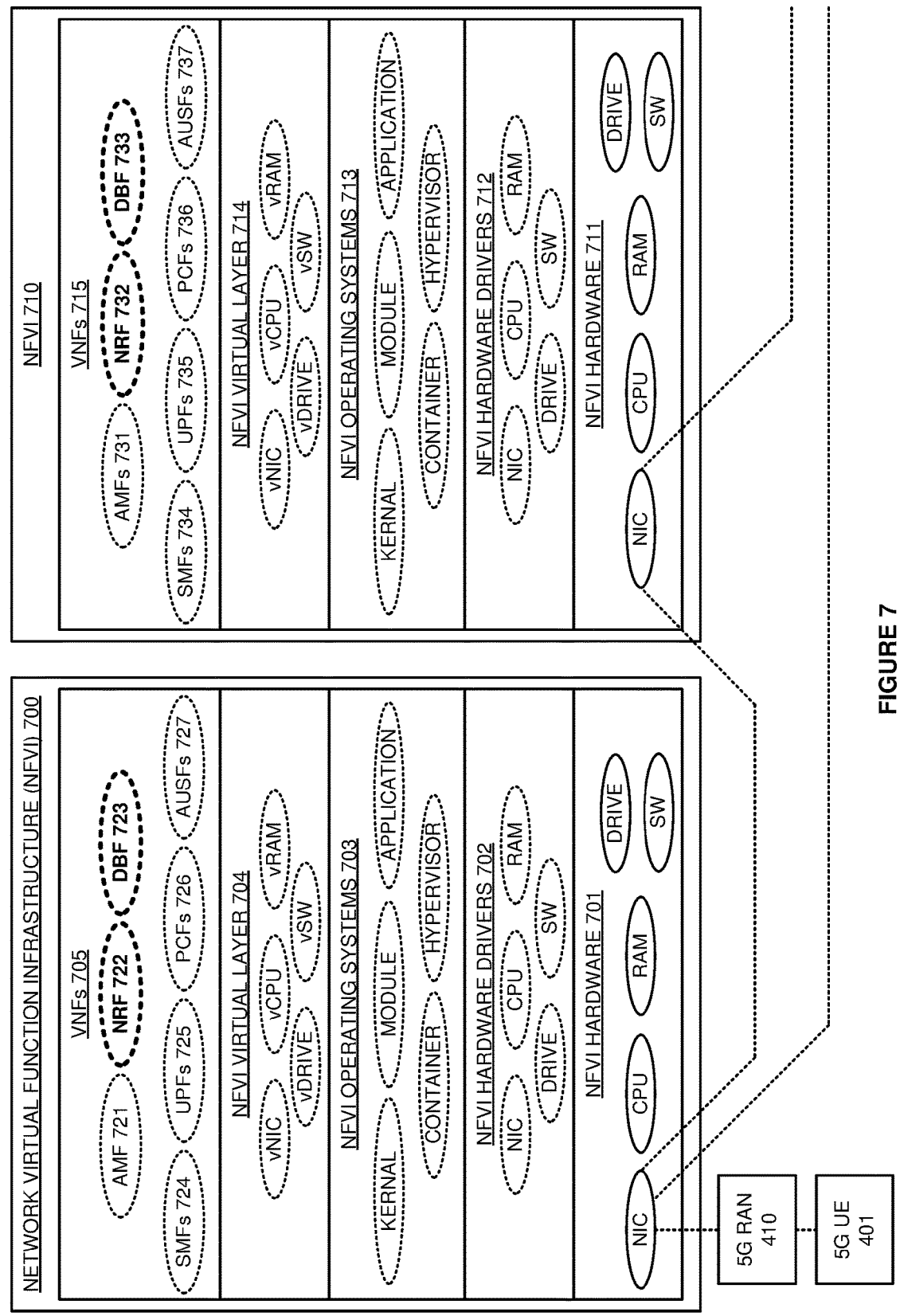
FIG. 7 illustrates Network Function Virtualization Infrastructures (NFVIs) in the 5G communication network.

FIG. 7 illustrates Network Function Virtualization Infrastructure (NFVI) 700 and NFVI 710. NFVI 700 comprises an example of network functions 121-127, although functions 121-127 may vary from this example. NFVI 710 comprises an example of network functions 131-137, although functions 131-137 may vary from this example. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 721, NRF 722, Database Function (DBF) 723, SMFs 724, UPFs 725, PCF 726, and AUSFs 727. Additional VNFs and network elements like Network Slice Selection Function (NSSF), Unified Data Management (UDM), Unified Data Registry (UDR), and Network Exposure Function (NEF) are typically present but are omitted for clarity. NFVI 700 may be located at a single site or be distributed across multiple geographic locations. The NIC in NFVI hardware 701 is coupled to 5G RAN 410, to a NIC in NFVI hardware 711, and to external systems. NFVI hardware 701 executes NFVI hardware drivers 702, NFVI operating systems 703, NFVI virtual layer 704, and NFVI VNFs 705 to form AMF 421, NRF 422, NF database 423, SMFs 424, UPFs 425, PCFs 426, and AUSFs 427.

In a like manner, NFVI 710 comprises NFVI hardware 711, NFVI hardware drivers 712, NFVI operating systems 713, NFVI virtual layer 714, and NFVI VNFs 715. NFVI hardware 711 comprises NICs, CPU, RAM, DRIVE, and SW. NFVI hardware drivers 712 comprise software that is resident in the NIC, CPU, RAM, DRIVE, and SW. NFVI operating systems 713 comprise kernels, modules, applications, containers, hypervisors, and the like. NFVI virtual layer 714 comprises vNIC, vCPU, vRAM, vDRIVE, and vSW. NFVI VNFs 415 comprise AMFs 731, NRF 732, Database Function (DBF) 733, SMFs 734, UPFs 735, PCF 736, and AUSFs 737. Additional VNFs and network elements are typically present but are omitted for clarity. NFVI 710 may be located at a single site or be distributed across multiple geographic locations. The NIC in NFVI hardware 711 is coupled to a NIC in NFVI hardware 701 and to external systems. NFVI hardware 711 executes NFVI hardware drivers 712, NFVI operating systems 713, NFVI virtual layer 714, and NFVI VNFs 715 to form AMFs 431, NRF 432, NF database 433, SMFs 434, UPFs 435, PCF 436, and AUSFs 437. In some examples, NFVI 700 and NFVI 710 are integrated into a signal NFVI that executes to from the network functions and network elements in Region A and Region B of 5G core 420.

Figure 8:
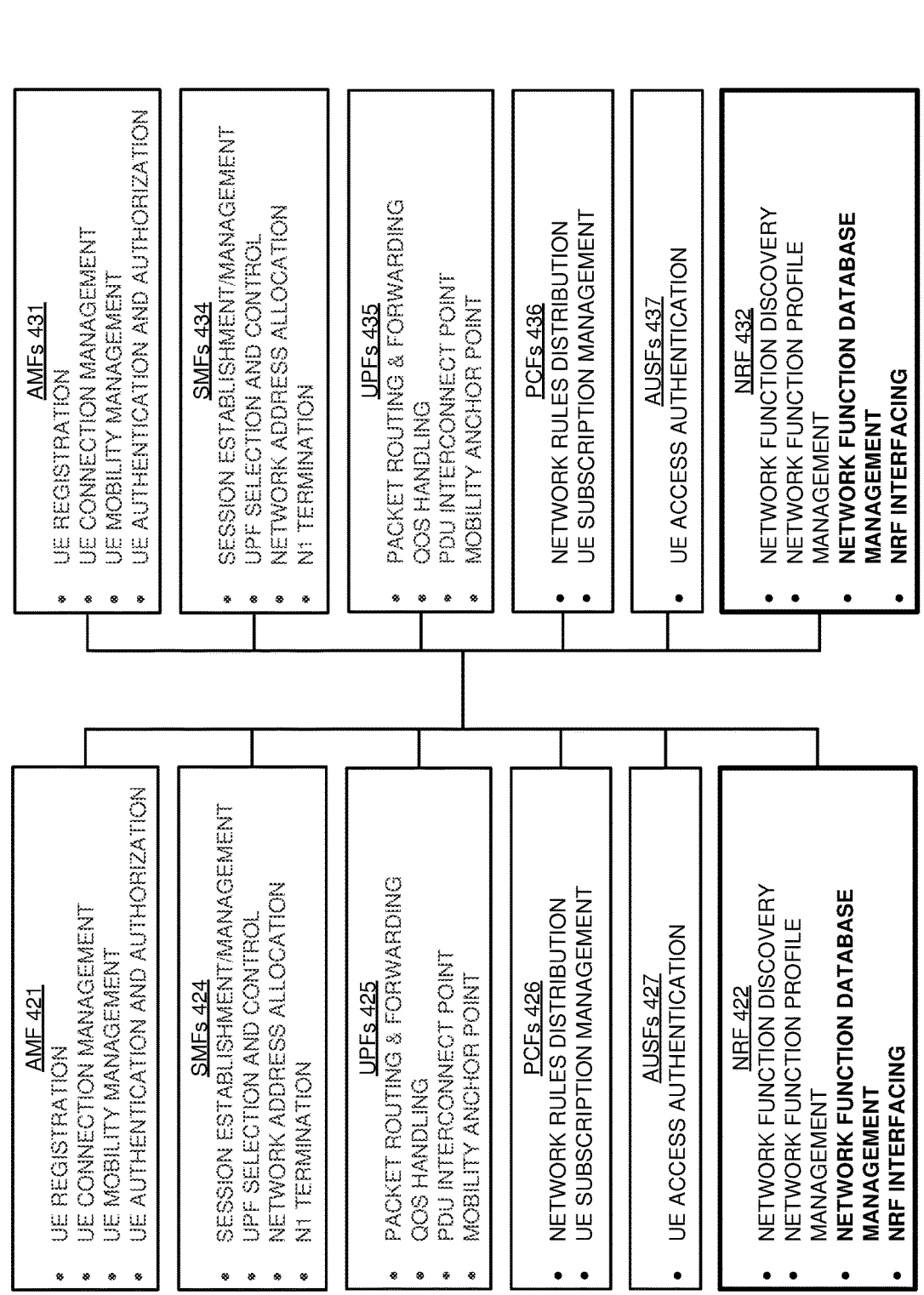
FIG. 8 further illustrates the NFVIs in the 5G communication network.

FIG. 8 further illustrates NFVI 700 and NFVI 710 in 5G communication network 400. AMFs 421 and 431 performs UE registration and connection, UE connection/mobility management, and UE authentication and authorization.

NRFs 422 and 432 perform network function discovery, network function profile management, network function database management, and NRF interfacing. SMFs 424 and 434 perform session establishment and management, UPF selection and control, network address allocation, and N1 termination. UPFs 425 and 435 perform packet routing & forwarding, packet inspection, QoS handling, PDU interconnection, and mobility anchoring. PCPs 426 and 436 perform network rules management and distribution and UE subscription policy management. AUSFs 427 and 437 perform UE access authentication.

In this example, AMF 421 discovers an SMF 424 through NRF 422, however the discovered and discovering NFs may vary in other examples. AMF 421 and NFs 424-427 transfer registration information to NRF 422. The registration information comprises NF ID, NF type, NF address, NF geolocation, NF load, NF capacity, and the like for individual ones of AMF 421 and NFs 424-427. NRF 422 receives the registration information and responsively creates NF profiles in NF database 423 for AMF 421 and NFs 424-427. The NF profiles indicate the status and registration information for the individual ones of NFs 421 and 424-427. NRF 422 maintains NF group data in NF database 423 that indicates the number of active sessions for each NF type. NRF 422 transfers registration update messages to NRF 432 that indicate the NF profiles and NF group data for AMF 421 and 424-427. NRF 432 updates NF database 433 to include the NF profiles and NF group data for AMFs 421 and NFs 424-427.

NFs 431 and 434-437 transfer registration information that comprises NF ID, NF type, NF address, NF geolocation, NF load, NF capacity, and the like for individual ones of NFs 431 and NFs 434-437 to NRF 432. NRF 432 receives the registration information and responsively creates NF profiles in NF database 433 for NFs 431 and 434-437. The NF profiles indicate the registration information and individual status for NFs 431 and 434-437. NRF 432 maintains NF group data in NF database 433 that indicates the number of active sessions for each NF type. NRF 432 transfers registration update messages to NRF 422 that indicate the NF profiles and NF group data for NFs 431 and 434-437. NRF 422 receives the registration update messages and responsively updates NF database 423 to include the NF profiles and NF group data for NFs 431 and 434-437.

AMF 421 and NFs 424-427 periodically transfer status updates to NRF 422 that indicate updated NF load, NF capacity, and the like. NRF 422 receives the status updates and responsively updates the NF profiles for AMF 421 and NFs 424-427 in NF database 423 to reflect the updated NF load, NF capacity, and/or other updated information. NRF 422 updates the NF group data in NF database 423 in response to the status updates. NRF 422 transfers status update messages for AMF 421 and NFs 424-427 to NRF 432 that indicate the updated NF profiles and updated NF group data for AMF 421 and NFs 424-427. NRF 432 updates NF database 433 to include the updated NF profiles and updated NF group data for AMFs 421 and NFs 424-427.

NFs 431 and 434-437 periodically transfer status updates to NRF 432 that indicate updated NF load, NF capacity, and the like. NRF 432 receives the status updates and responsively updates the NF profiles for NFs 431 and 434-437 in NF database 433 to indicate the updated NF load, NF capacity, and/or other updated information. NRF 432 updates the NF group data in NF database 433 in response to the status updates. NRF 432 transfers status update messages for NFs 431 and 434-437 to NRF 422 that indicate the updated NF profiles and updated NF group data for NFs 421 and 434-437. In response, NRF 422 updates NF database 423 to include the updated NF profiles and updated NF group data for NFs 431 and 434-437.

AMF 421 receives a PDU session request from UE 401. In response to the PDU session request, AMF 421 determines its currently available SMFs cannot handle the requested PDU session. AMF 421 transfers an NF discovery request for an SMF to NRF 422. NRF 422 identifies the requested NF type as SMF. NRF 422 queries NF database 423 for NF profiles and NF group data for SMFs. NRF 422 identifies individual ones of SMFs 424 and 434 in Regions A and B based on the NF profiles. NRF 422 identifies the number of active SMFs of SMFs 424 in Region A and the number of active SMFs of SMFs 434 in Region B based on the NF group data. NRF 422 prioritizes the individual ones of SMFs 424 and 434 based on NF geolocation, NF load, NF capacity. NRF 422 determines that SMFs 424 are more numerous than SMFs 434 based on the group data. NRF 422 prioritizes SMFs 424 over SMFs 434 to load balance the discovery of SMFs. NRF 422 normalizes the SMF geolocation, load, capacity, and load balance priority into a combined priority score for each of the individual ones of SMFs 424 and 434. NRF 422 prioritizes the individual ones of SMFs 424 and 434 based on their priority scores. NRF 422 identifies a set of SMFs 424 and 434 that have performance below a threshold and responsively excludes that set of SMFs 424 and 434 from the discovery response.

NRF 422 generates a prioritized list based on the priority scores of the individual ones of SMFs 424 and 434. The prioritized list ranks SMFs that are more suited to serve AMF 421 higher than SMFs that are less suited to serve AMF 421 and indicates SMF geolocation, SMF load, and SMF capacity for the individual ones of SMFs 424 and 434. The prioritized list excludes the set of SMFs 424 and 434 that fell below the performance threshold. NRF 422 indicates the prioritized list to AMF 421.

AMF 421 selects one of SMFs 424 and 434 based on its priority, geolocation, load, capacity, and/or other factors. AMF 421 directs the selected SMF to establish the PDU session for UE 401. For example, AMF 421 may transfer the PDU session request to an SMF of SMFs 434 to establish the PDU session for UE 401. In other examples, AMF 421 may operate in a similar manner to discover other NFs in Regions A and B through NRF 422.

Figure 9:
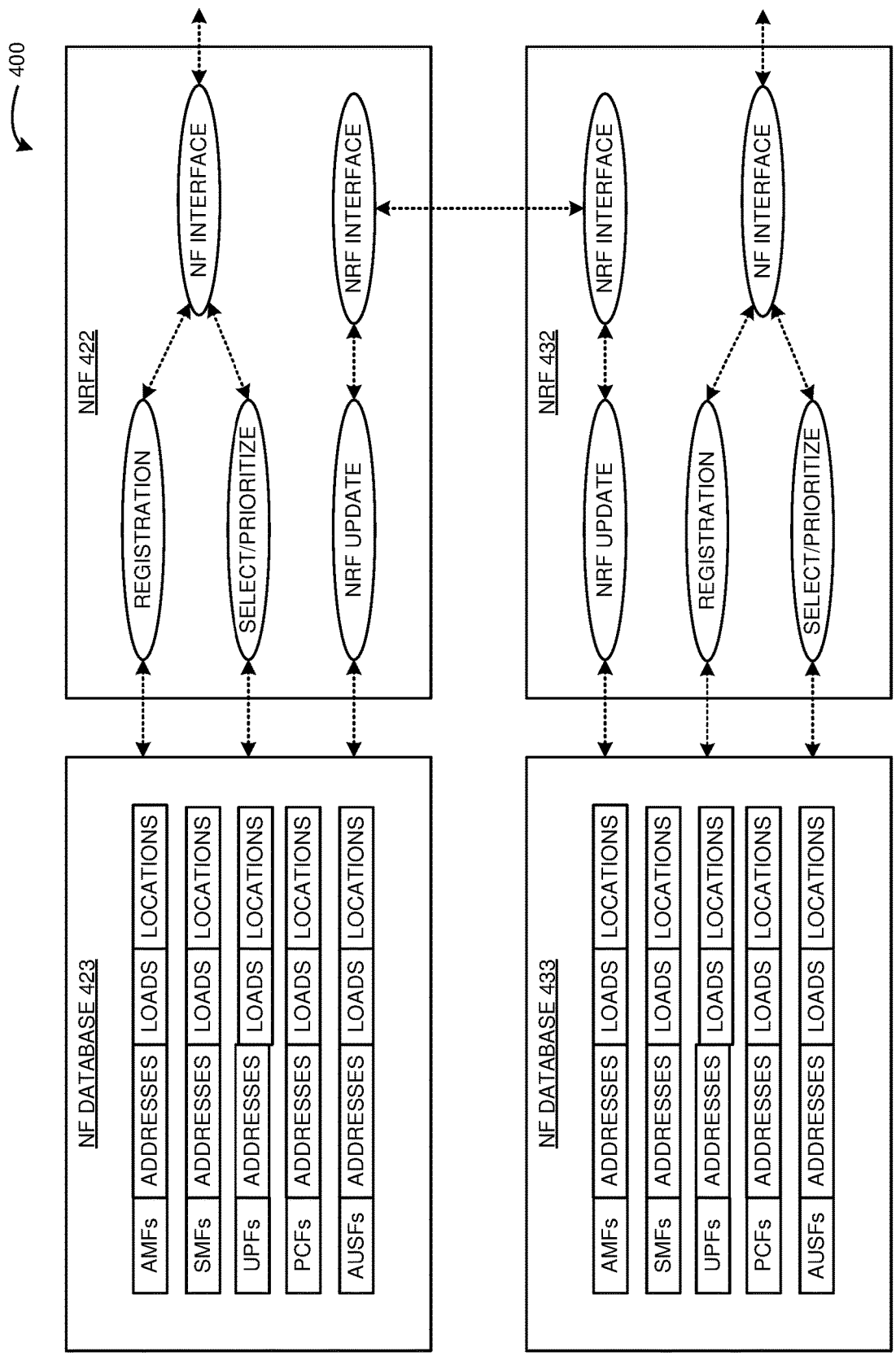
FIG. 9 illustrates NRFs in the 5G communication network.

FIG. 9 illustrates NRFs 422 and 432 in 5G communication network 400. NRFs 422 and 432 comprise examples of NRFs 127 and 137, although NRFs 127 and 137 may differ. NF databases 423 and 433 store NF data by type, address, load, and location for AMFs, SMFs, UPFs, PCFs, and AUSFs. NRFs 422 and 432 comprise registration components that interact with network functions to obtain NF types and NF addresses for databases 423 and 433. NRFs 422 and 432 comprise select/prioritize components that select NF addresses based on type and prioritize the selected NF addresses based on load and location for NFs. Lightly loaded NFs are typically given a higher priority than heavily loaded NFs. Geographically closer NFs are typically given a higher priority than geographically further NFs. Load, location, and other factors may be normalized and combined into a common priority score.

Figure 10:
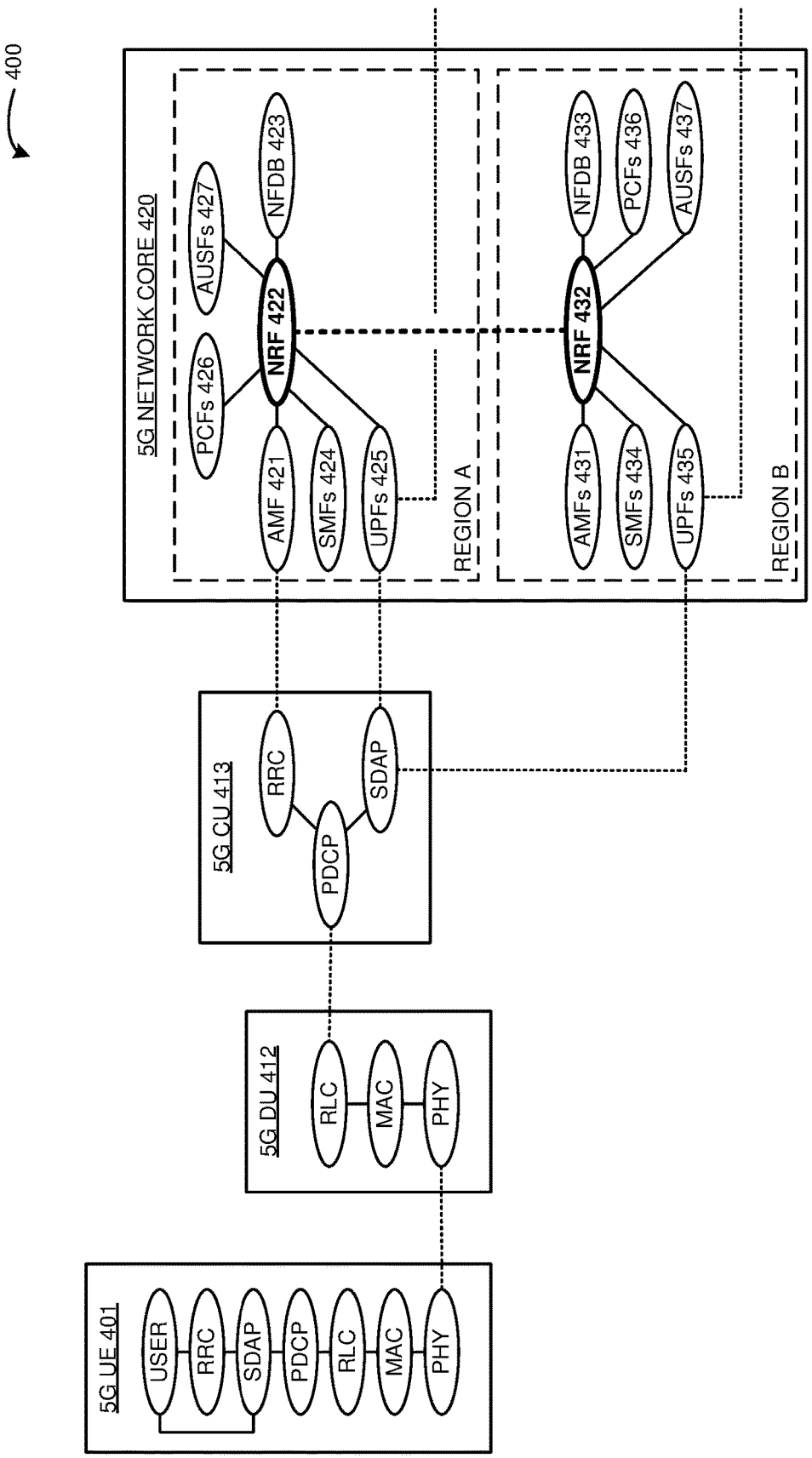
FIG. 10 illustrates an exemplary operation of the 5G communication network to discover NFs through the NRFs.

FIG. 10 illustrates an exemplary operation of the 5G communication network to discover NFs through NRFs 422 and 432. The operation may vary in other examples. In this example, AMF 421 discovers an AUSF to authenticate UE 401 and discovers an SMF to serve a PDU session to UE 401, however the discovered and discovering network functions may differ in other examples.

AMF 421 and NFs 424-427 register with NRF 422. NRF 422 responsively creates NF profiles in NF database 423 for AMF 421 and NFs 424-427. The NF profiles indicate individual status like NF ID, NF type, NF address, NF geolocation, NF load, and NF capacity for AMF 421 and NFs 424-427. NRF 422 determines NF group data that indicates the number of active sessions for each NF type. NRF 422 maintains the NF group data in NF database 423. NFs 431 and 434-437 register with NRF 432. NRF 432 responsively creates NF profiles in NF database 433 for NFs 431 and 434-437. The NF profiles indicate individual status for ones of NFs 431 and 434-437. NRF 432 determines NF group data for NFs 431 and 434-437 that indicates the number of NF active sessions for each NF type. NRF 432 maintains the group data in NF database 433.

In response to the registrations of AMF 421 and NFs 424-427, NRF 422 transfers registration update messages to NRF 432. The registration update messages indicate the NF profiles and NF group data for AMF 421 and NFs 424-427. NRF 432 updates NF database 433 to indicate the NF profiles and NF group data for AMF 421 and NFs 424-427. Likewise, in response to the registrations of NFs 431 and 434-437, NRF 432 transfers registration update messages that indicate the NF profiles and NF group data for NFs 434-437 to NRF 422. NRF 422 responsively updates NF database 423 to include the NF profiles and NF group data for NFs 431 and 434-437.

AMF 421 and NFs 424-427 transfer status updates to NRF 422. NRF 422 responsively updates the NF profiles in NF database 423 for AMF 421 and NFs 424-427 to indicate the updated status for AMF 421 and NFs 424-427. NRF 422 determines new NF group data based on the updated status. NRF 422 maintains the new NF group data in NF database 423. NRF 422 transfers status update messages to NRF 432 that indicate the updated NF profiles and NF group data for AMF 421 and NFs 424-427. NRF 432 updates NF database 433 to indicate the updated NF profiles and NF group data for AMF 421 and NFs 424-427.

NFs 431 and 434-437 transfer status updates to NRF 432. NRF 432 responsively updates NF profiles in NF database 433 for NFs 431 and 434-437 to indicate the updated status for individual ones of NFs 431 and 434-437. NRF 432 determines new NF group data for NFs 431 and 434-437 based on the status updates. NRF 432 maintains the new NF group data in NF database 433. NRF 432 transfers status update messages to NRF 422 that indicate the updated NF profiles and NF group data for NFs 431 and 424-427. NRF 432 updates NF database 433 to indicate the updated NF profiles and NF group data for NFs 431 and 424-427.

The RRC in UE 401 wirelessly attaches to the RRC in CU 413 over the PDCPs, RLCs, MACs, and PHYs. The RRC in CU 413 transfers a registration request for UE 401 to AMF 421. AMF 421 receives the registration request interacts with other network functions to authenticate and authorize UE 401 for wireless network services. AMF 421 determines that it does not currently have access to an AUSF to authenticate UE 401. AMF 421 transfers a discovery request for an AUSF to NRF 422. NRF 422 queries NF database for AUSFs. NF database 423 returns NF profiles and NF group data for AUSFs 427 and 437. NRF 422 indicates available ones of AUSFs 427 and 437 and the load and location of the available ones of AUSFs 427 and 437 to AMF 421. AMF 421 receives the indication and responsively selects one AUSFs 437 based on its load and location.

AMF 421 interacts with the selected one of AUSFs 437 to authenticate UE 401. Responsive to the authentication and authorization, AMF 421 retrieves UE context for UE 401.

The UE context comprises QoS, slice IDs, network addresses, and the like. AMF 421 transfers the UE context for UE 401 to the RRC in CU 413. The RRC in CU 413 transfers the UE context to the RRC in UE 401 over the PDCPs, RLCs, MACs, and PHYs.

A user application in UE 401 executes. In response, the RRC in UE 401 transfers a PDU session request to the RRC in CU 413 over the PDCPs, RLCs, MACs, and PHYs. The RRC in CU 413 transfers the PDU session request to AMF 421. AMF 421 determines that it does not currently have access to an SMF that can establish the requested PDU session. For example, the SMFs that AMF 421 currently has access to may be outside of the service area for the requested PDU session type. In response, AMF 421 transfers an NF discovery request for an SMF to NRF 422. NRF 422 receives the NF discovery request from AMF 421 and identifies the requested NF type as SMF. NRF 422 queries NF database 423 for NF profiles and NF group data for SMFs. NF database 422 returns NF profiles for SMFs 424 and 434 to NRF 422. NRF 422 identifies individual ones of SMFs 424 and 434 based on the NF profiles. NRF 422 identifies the number of active SMFs in Region A and Region B based on the NF group data. NRF 422 ranks the individual ones of SMFs 424 and 434 based on NF geolocation, NF load, NF capacity, and the number of active SMF sessions in each region.

NRF 422 generates a prioritized list based on the ranks of the individual ones of SMFs 424 and 434. NRF 422 omits ones of SMFs 424 and 434 from the prioritized list that are unable to adequately serve AMF 421. For example, NRF 422 may omit an SMF that is too geographically distant from AMF 421. NRF 422 transfers the prioritized list to AMF 421. AMF 421 selects an SMF of SMFs 424 based its rank, geolocation, CPU load, memory occupancy, and the number of active NF instances.

AMF 421 directs the selected SMF of SMFs 424 to establish the PDU session for UE 401. The selected SMF interacts with a UPF of UPFs 425 or UPFs 435 to establish the PDU session. The selected SMF transfers session context for the PDU session to AMF 421. AMF 421 transfers network signaling that indicates the session context to the RRC in CU 413. The RRC in CU 413 transfers network signaling that indicates the session context to the RRC in UE 401 over the PDCPs, RLC, MACs, and PHYs. The SDAP in UE 401 uses the session context to establish the PDU session. The SDAP in UE 401 exchanges user data for the PDU session with the SDAP in CU 413 over the PDCPs, RLC, MACs, and PHYs. The SDAP in CU 413 exchanges the user data with the UPF selected by the selected SMF. The UPF exchanges the user data with external systems.

A PCF of PCFs 436 transfers a multitude of unauthorized discovery requests to NRF 432. NRF 432 determines a request threshold. NRF 432 receives the multiple discovery requests from the PCF of PCFs 436. NRF 432 determines the number of requests received from the from the PCF of PCFs 436 exceeds the request threshold. In response, NRF 422 blacklists the PCF of PCFs 426 from sending discovery requests to prevent that PCF of PCFs 426 from spamming NRF 432.

The wireless data network circuitry described above comprises computer hardware and software that form special-purpose network circuitry to direct another wireless communication network to discover network functions through an NRF. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to discover network functions through the NRF.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to select Network Functions (NFs) using a first Network Repository Function (NRF) and a second NRF, the method comprising:
   the first NRF receiving first status data from a first set of the NFs and transferring the first status data to the second NRF;
   the second NRF receiving second status data from a second set of the NFs and transferring the second status data to the first NRF;
   the first NRF receiving a request for one of the NF types, and in response, identifying a first set of the first status data for the one of the NF types, identifying a second set of the second status data for the one of the NF types, and transferring a response that indicates the first set of the first status data and the second set of the second status data;
   the second NRF receiving another request for another one of the NF types, and in response, identifying a third set of the first status data for the other one of the NF types, identifying a fourth set of the second status data for the other one of the NF types, and transferring another response that indicates the third set of the first status data and the fourth set of the second status data;

wherein the wireless communication network selects individual ones of the NFs based on the first set of the first status data, the second set of the second status data, the third set of the first status data, and the fourth second set of the second status data;

wherein the first NRF identifying the first set of the first status data and the second set of the second status data for the one of the NF types and transferring the response comprises prioritizing the NFs based on geolocation and indicating the priority; and wherein the second NRF identifying the third set of the first status data and the fourth set of the second status data for the other one of the NF types and transferring the other response comprises prioritizing the NFs based on geolocation and indicating the priority.

2. The method of claim 1 wherein the status data indicates load and geolocation for the individual ones of the NFs.

3. The method of claim 1 wherein:
the first NRF identifying the first set of the first status data and the second set of the second status data for the one of the NF types and transferring the response comprises prioritizing the NFs based on load and indicating the priority; and
the second NRF identifying the third set of the first status data and the fourth set of the second status data for the other one of the NF types and transferring the other response comprises prioritizing the NFs based on load and indicating the priority.

4. The method of claim 1 wherein:
the first NRF identifying the first set of the first status data and the second set of the second status data for the one of the NF types and transferring the response comprises prioritizing the NFs based on load and geolocation and indicating the priority; and
the second NRF identifying the third set of the first status data and the fourth set of the second status data for the other one of the NF types and transferring the other response comprises prioritizing the NFs based on load and geolocation and indicating the priority.

5. The method of claim 1 wherein:
the first NRF identifying the first set of the first status data and the second set of the second status data for the one of the NF types and transferring the response comprises prioritizing the NFs to load-balance the NFs and indicating the priority; and
the second NRF identifying the third set of the first status data and the fourth set of the second status data for the other one of the NF types and transferring the other response comprises prioritizing the NFs to load-balance the NFs and indicating the priority.

6. The method of claim 1 wherein:
the first NRF identifying the first set of the first status data and the second set of the second status data for the one of the NF types comprises hiding individual ones of the NFs; and
the second NRF identifying the third set of the first status data and the fourth set of the second status data for the other one of the NF types comprises hiding other individual ones of the NFs.

7. The method of claim 1 further comprising:
the first NRF receiving unauthorized messages from an entity and responsively blocking the entity; and
the second NRF receiving other unauthorized messages from another entity and responsively blocking the other entity.

8. The method of claim 1 wherein the first NRF comprises a home NRF and the second NRF comprises a visited NRF.

9. The method of claim 1 wherein the NF status data comprises microprocessor load and memory capacity.

10. A wireless communication network configured to select Network Functions (NFs) using a first Network Repository Function (NRF) and a second NRF, the wireless communication network comprising:
the first NRF configured to receive first status data from a first set of the NFs and transfer the first status data to the second NRF;
the second NRF configured to receive second status data from a second set of the NFs and transfer the second status data to the first NRF;
the first NRF configured to receive a request for one of the NF types, and in response, identify a first set of the first status data for the one of the NF types, identify a second set of the second status data for the one of the NF types, and transfer a response that indicates the first set of the first status data and the second set of the second status data;
the second NRF configured to receive another request for another one of the NF types, and in response, identify a third set of the first status data for the other one of the NF types, identify a fourth set of the second status data for the other one of the NF types, and transfer another response that indicates the third set of the first status data and the fourth set of the second status data;
wherein the wireless communication network selects individual ones of the NFs based on the first set of the first status data, the second set of the second status data, the third set of the first status data, and the fourth second set of the second status data;
wherein the first NRF is configured to identify the first set of the first status data and the second set of the second status data for the one of the NF types and transfer the response comprises the first NRF configured to prioritize the NFs based on geolocation and indicate the priority; and
wherein the second NRF is configured to identify the third set of the first status data and the fourth set of the second status data for the other one of the NF types and transfer the other response comprises the second NRF configured to prioritize the NFs based on geolocation and indicate the priority.

11. The wireless communication network of claim 10 wherein the status data indicates load and geolocation for the individual ones of the NFs.

12. The wireless communication network of claim 10 wherein:
the first NRF is configured to identify the first set of the first status data and the second set of the second status data for the one of the NF types and transfer the response comprises the first NRF configured to prioritize the NFs based on load and indicate the priority; and
the second NRF is configured to identify the third set of the first status data and the fourth set of the second status data for the other one of the NF types and transfer the other response comprises the second NRF configured to prioritize the NFs based on load and indicate the priority.

13. The wireless communication network of claim 10 wherein:
the first NRF is configured to identify the first set of the first status data and the second set of the second status data for the one of the NF types and transfer the response comprises the first NRF configured to prioritize the NFs based on load and geolocation and indicate the priority; and the second NRF is configured to identify the third set of the first status data and the fourth set of the second status data for the other one of the NF types and transfer the other response comprises the second NRF configured to prioritize the NFs based on load and geolocation and indicate the priority.

14. The wireless communication network of claim 10 wherein:

the first NRF is configured to identify the first set of the first status data and the second set of the second status data for the one of the NF types and transfer the response comprises the first NRF configured to prioritize the NFs to load-balance the NFs and indicate the priority; and the second NRF is configured to identify the third set of the first status data and the fourth set of the second status data for the other one of the NF types and transfer the other response comprises the second NRF configured to prioritize the NFs to load-balance the NFs and indicate the priority.

15. The wireless communication network of claim 10 wherein:

the first NRF is configured to identify the first set of the first status data and the second set of the second status data for the one of the NF types comprises the first NRF configured to hide individual ones of the NFs; and the second NRF is configured to identify the third set of the first status data and the fourth set of the second status data for the other one of the NF types comprises the second NRF configured to hide other individual ones of the NFs.

16. The wireless communication network of claim 10 further comprising:

the first NRF configured to receive unauthorized messages from an entity and responsively block the entity; and the second NRF configured to receive other unauthorized messages from another entity and responsively block the other entity.

17. The wireless communication network of claim 10 wherein the first NRF comprises a home NRF and the second NRF comprises a visited NRF.

18. The wireless communication network of claim 10 wherein the NF status data comprises microprocessor load and memory capacity.

* * * * *